July 20, 1965  R. SOVITZKY  3,195,561
PLASTIC VALVE DEVICE WITH TORQUE ABSORBING
COUPLING AND BRACKET MEANS
Filed Nov. 24, 1961
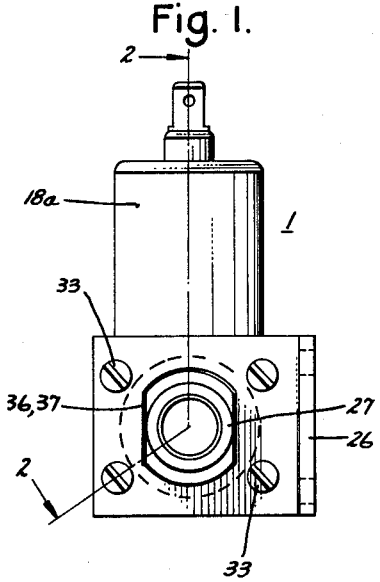
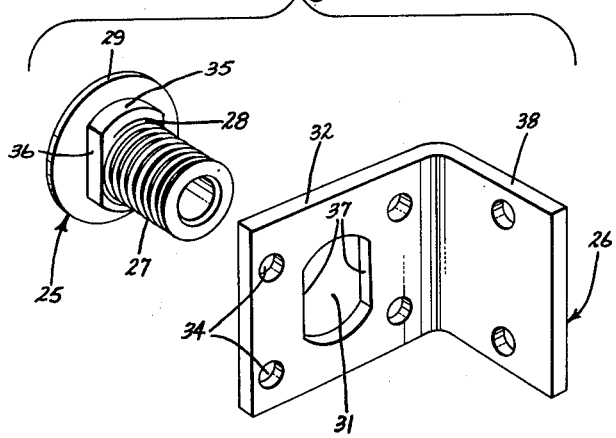
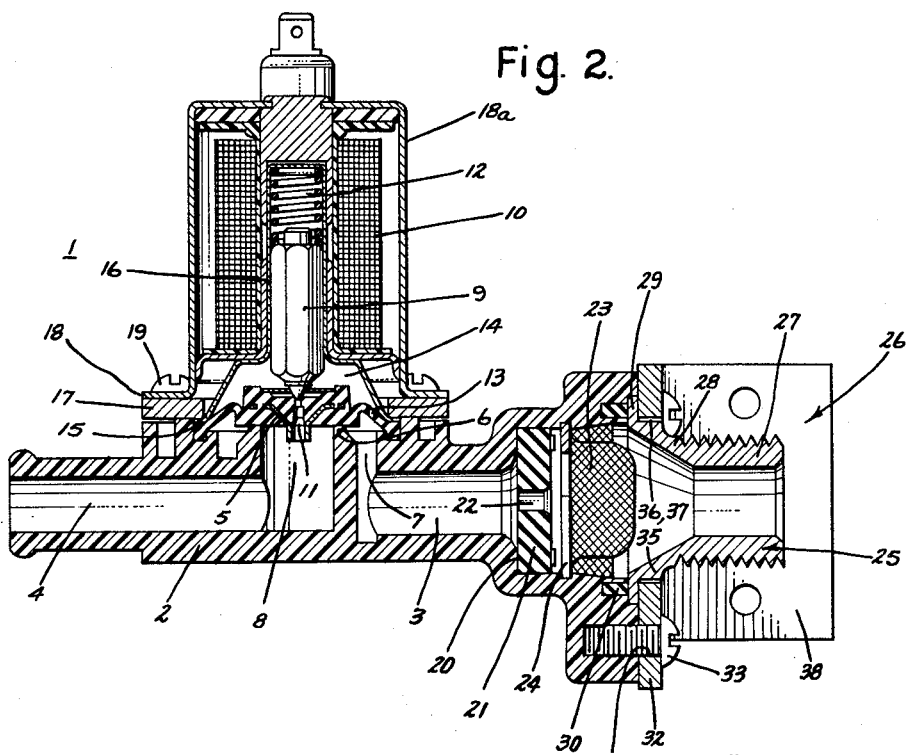
Inventor:
Richard Sovitzky,
by H.F. Manbeck, Jr.
Attorney.

3,195,561
PLASTIC VALVE DEVICE WITH TORQUE ABSORB-
ING COUPLING AND BRACKET MEANS
Richard Sovitzky, West Allis, Wis., assignor to General
Electric Company, a corporation of New York
Filed Nov. 24, 1961, Ser. No. 154,576
4 Claims. (Cl. 137—315)

My invention relates to a valve device for controlling fluid flow and more particularly to a water valve construction for use with appliances.

Domestic appliances such as automatic dishwashers and clothes washers customarily include a solenoid actuated valve for controlling the filling of the machine with water. At one time the main body or casing of these valves was made of metal, such as brass, with the body being drilled and machined to provide the proper passageways and seats. In recent years, however, molded plastic bodies have been used for the valves which are intended for use in clothes washers and portable dishwashers. The plastic bodies are much cheaper than the brass bodies and there is ordinarily little danger of their being damaged during installation and use since they are not connected directly to the house plumbing. Instead they are connected to a short hose coupling at the factory and this hose is in turn connected to the house plumbing when the machine is installed.

The appliance industry has, however, been unwilling to use the plastic valve bodies for undercounter dishwashers. The valves in the undercounter dishwashers are ordinarily connected directly to the house plumbing without any intermediate hose, and the manufacturers have felt that plastic valve bodies would not be satisfactory for such service despite their significant cost advantage over brass bodies. In particular, the manufacturers have feared that the plastic bodies would be susceptible to damage during connection of the house plumbing so that they would leak or otherwise fail during service. This susceptibility to damage is, in fact, two-fold. First of all, if the plumber should cross thread the pipe coupling on the plastic threads provided at the valve inlet, the threads are likely to be seriously damaged whereby an unsatisfactory connection results. Secondly, as the plumber tightens down the pipe coupling, stresses are necessarily applied to the valve body which may cause it to fail either immediately or at some later time. Thus, plastic valve bodies have not been considered acceptable for "plumbed-in" dishwashers which are connected directly to the house plumbing.

Accordingly, it is a general object of my invention to provide a new and improved valve construction which will obviate these difficulties and allow a plastic valve body to be used for "plumbed-in" dishwashers and the like.

It is a more specific object of my invention to provide a new and improved valve construction which uses a low cost plastic valve body, but which allows for connection of the valve body to a pipe coupling without any substantial stresses being applied to the body.

In carrying out my invention in one form thereof, I provide an improved valve construction which includes a molded plastic valve body. This valve body includes an inlet, outlet and a valve seat which is located between them for cooperation with a suitable valve means, such as a diaphragm. The valve means in the customary manner controls the flow through the valve by opening and closing relative to the valve seat. The plastic body by my invention may be connected to the house plumbing without an intervening hose and specifically I provide a special mounting and inlet unit for that purpose. This unit includes a metal fitting positioned over the inlet of the valve body and a metal bracket which is secured to the valve body for mounting it. The metal bracket holds the fitting in place on the valve body and the bracket and the fitting are integrated so that any torque applied to the fitting is taken up by the bracket rather than by the valve body. Thus, any stress applied to the fitting during the connection of the valve to the house plumbing is not transmitted to the plastic valve body, and, in addition, there is no danger due to cross threading since the connection is made to the metal fitting rather than to the plastic body. My valve construction thereby permits the use of a plastic valve body for applications such as "plumbed-in" dishwashers, and the like, which are intended for direct connection to the house plumbing.

The subject matter which I regard as my invention is particularly pointed out and distinctly claimed in the concluding portion of this specification. However, my invention, together with further objects and advantages thereof, may best be understood by reference to the following description taken in conjunction with the accompanying drawing in which:

FIG. 1 is an end elevational view of a valve construction embodying my invention in one form thereof;

FIG. 2 is a cross sectional view of the valve arrangement taken on the line 2—2 of FIG. 1; and FIG. 3 is an exploded view of the inlet and mounting unit included in the valve construction.

Referring now to FIGS. 1 and 2 of the drawing, I have shown therein a valve device 1 which embodies my invention in one form thereof. The valve 1 includes a main casing or body 2 which is molded from a suitable plastic material. It will be understood that my invention is not directed to any particular plastic material since a number of thermo-plastic or thermo-setting resinous materials may be employed to form the valve body, and that in using the term "plastic," I intend to cover all such moldable organic materials as are suitable for valve bodies. By way of example, I have found that the plastic body 2 may be advantageously formed of polyamides (nylon).

Molded integrally in the plastic body valve 2 are an inlet passageway 3 and an outlet passageway 4. The flow between the inlet 3 and the outlet 4 is controlled by means of a diaphragm member 5 which seats on an upstanding flange or valve seat 6 molded between the inlet and the outlet. The inlet 3 leads to the outer side of the valve seat 6 through a cross passage 7, and the outlet 4 is connected to the center opening in the seat through a cross passage 8. Thus, when the diaphragm is lifted off the seat, the inlet and outlet are placed in direct communication. On the other hand, when the diaphragm is seated, communication is closed between the inlet and outlet so that no flow passes through the valve.

The diaphragm or valve means 5 is controlled by means of a plunger 9 which is actuated by a solenoid coil 10 disposed around it. The central or valve portion of the diaphragm includes an aperture 11, and when the plunger 9 is in its illustrated or lower position, the point of the plunger closes the aperture 11. The seating of the plunger 9 in the opening 11 causes the diaphragm to seat on the valve seat 6, in a manner which will be explained hereinafter, and thereby close the opening between the inlet 3 and the outlet 4. On the other hand, when the solenoid 10 is energized so as to pull the plunger 9 upwardly against a biasing spring 12, the diaphragm is then actuated so as to move off the valve seat and open the connection between the inlet 3 and the outlet 4.

The manner in which the diaphragm is controlled by the solenoid plunger 9 is well known in the art but for a full understanding of my improved valve construction a brief explanation of the diaphragm operation will now be given. It will be noted that the diaphragm includes a small bleed hole 13 in its flexible portion between the valve seat and its outer periphery. The water or other liquid entering the valve through the inlet 3 may leak under pressure through this opening into the chamber 14 immediately above the diaphragm. As a result, assuming that the plunger 9 is in its lower position closing the opening 11 so that the liquid cannot escape through it, the diaphragm is subjected to the inlet water pressure on its upper side as well as its lower side (as viewed in FIG. 2). As may be seen from FIG. 2, the area exposed to this pressure is greater on the upper side of the diaphragm than on the lower side and, as a result the pressure forces the diaphragm into its seated position on the flange 6 thereby closing off the outlet passageway 4 from the inlet passageway 3.

When, however, the solenoid 10 is energized, the plunger 9 is lifted so as to open the center aperture 11 in the diaphragm. The water in the chamber 14 then begins to drain through the opening 11 and since the aperture is larger than the bleed hole 13 of the diaphragm, the liquid within the chamber 14 escapes into the outlet 6 faster than it can be replaced through the bleed hole. The pressure on the upper side of the diaphragm thereby becomes insufficient to hold the diaphragm seated on the valve seat or flange 6 and the diaphragm rises or, more accurately, is forced off the seat. Thereby a direct passage is opened from the inlet 3 to the outlet 4 and flow passes freely through the valve.

This flow continues as long as the coil remains energized. When it is desired to stop the flow, at that time the solenoid coil 10 is de-energized and the plunger 9 is returned into contact wtih the diaphragm by the biasing spring 12. As soon as the plunger closes the aperture 11, the pressure again begins to build up in the chamber 14. In a short time the total force applied to the upper side of the diaphragm (as viewed in FIG. 2) becomes greater than the force applied to the lower side of the diaphragm and thereby the diaphragm again engages the valve seat 6 so as to shut off the valve.

With regard to the mounting of the diaphragm and the solenoid assembly, it will be noted that they are mounted directly on the valve body 2. Specifically, the outer edge of the diaphragm is held between the valve body and the lower flange 15 of the plunger housing 16. The plunger housing is, in turn, engaged by an annular retaining ring 17, which itself carries the lower flange 18 of the solenoid coevr 18a. All of the parts are held in place by the screws 19 which pass through suitable apertures (not shown) in the solenoid cover and the retaining ring into the valve body itself.

As is shown in FIG. 2, the inlet passageway 3 is enlarged at its outer end and is provided with a shoulder 20 on which is seated a resilient annulus 21. The annulus 21 deforms so as to progressively close off its center aperture 22 with increasing pressure from the inlet, and thereby keeps the flow through the valve at a relative constant rate when the diaphragm 5 is opened no matter what the inlet pressure may be. Upstream from the annulus or flow control 21 there is positioned a hat-shaped metal strainer or screen 23 which is seated on a snap-ring 24 held by the valve casing 2. The flow control and screen may take various forms and are shown by way of example only.

As mentioned above, an important advantage of my invention is that the valve device 1 may be connected directly to a pipe coupling without there being any need for an intervening hose. To accomplish this result, I provide a new and improved inlet and mounting unit for the valve body comprising a rigid metal fitting 25 and a rigid metal mounting bracket 26. In the illustrated embodiment the fitting and the mounting bracket comprise separate parts which are integrated together to form the mounting and inlet unit, this being done for ease of manufacture, but it will be understood that if desired the mounting bracket and the fitting could be formed as a single piece.

Referring first to the fitting 25, it will be seen that it includes an outer externally threaded section 27 which is joined by a more or less conical-shaped portion 28 to an inner flange 29. The flange 29 is seated on the right hand surface of the valve body (FIG. 2) and is sealed to the body by means of an annular gasket 30 so that a liquid tight seal is provided therebetween. Thus, any liquid entering the fitting 25 from a connected pipe passes therethrough into the valve body, and thence past the strainer 23 and the flow control 21 into the inlet passage 3.

The rigid fitting 25 is held on the plastic valve body 2 by means of the mounting bracket 26. As is best shown in FIG. 3, the mounting bracket is an L-shaped member having an aperture 31 in its leg 32 which engages the valve body, the aperture 31 being arranged to fit over the metal fitting 25. The bottom or inner surface of the leg 32 engages the outer surface of the flange 29 of the fitting and thereby holds it securely against the valve body and the gasket 30. Screws 33 extend through suitable holes 34 in the bracket and are threaded into the valve body 2 so as to retain the bracket and the fitting in place.

Besides holding the fitting on the valve body 2, the bracket also serves to take up or receive any torque which is applied to the fitting when a pipe coupling is applied thereto. To provide this feature, the fitting and the bracket are formed with inner-connecting or engaging surfaces capable of transmitting the stress from the fitting to the bracket. Specifically, the fitting is provided with a shoulder 35 immediately outwardly from the flange 29 and this shoulder is flatted at diametrically opposite points as indicated at 36. These flats 36 fit against and engage suitable corresponding flatted sides 37 formed in the aperture 31 of the bracket. The manner of engagement between the flats 36 of the fitting and the flatted sides 37 of the aperture in the bracket may be readily seen by referring to FIGS. 1 and 3. With this arrangement, whenever any torque is applied to the fitting 25, it is immediately transmitted to and taken up by the bracket through the engagement between the flatted sides. Since the fitting is not screwed or otherwise attached directly to the valve casing, none of this stress is transmitted to the valve casing, instead it is received by the bracket.

The leg 38 of the bracket remote from the aperture 31 is attached to a mounting member (not shown) by any suitable means as, for example, screws and, thereby, the stress received by it from the fitting is transmitted to the mounting member. Since the bracket carries the plastic valve body, the valve body will not be affected by the stressing of the bracket; instead the stress will necessarily be taken up by the mounting member from the bracket. Thereby the plastic valve body 2 cannot be damage as a result of torque being applied to the inlet fitting during the connection of the valve body to the household plumbing.

With this construction, there is also no possibility of damage through cross-threading between the pipe coupling and the fitting. The fitting is formed of metal and thereby if there is cross-threading, it is between two metal members whereby damage is extremely unlikely. It will be understood that the bracket and the fitting are made of rigid material, preferably metal, and in the illustrated embodiment it is contemplated that the fitting 25 will be made of brass and the bracket 26 of a suitable material such as steel. Of course, if the bracket and the fitting were formed as a single piece, it is contemplated that brass will ordinarily be used so as to provide a suitable structure for connection to the plumbing.

From the above, it will be seen that I have provided an improved valve construction which utilizes an inexpensive plastic valve body but yet is so arranged that it may be connected directly to the household plumbing without an intermediate hose being required. Due to the rigid inlet and mounting assembly formed of metallic material, there is no danger of the valve being damage through cross-threading and also the valve cannot be damaged by reason of torque applied during connection of the valve to the plumbing. Instead the stress is passed directly to the mounting bracket and thence to the supporting structure of the appliance or other machine in which the valve is used. My construction thus provides an inexpensive valve device suitable for use in plumbed-in appliances without any of the disadvantages heretofore inherent in plastic valves used for such purposes.

While in accordance with the patent statutes, I have described that is presently considered to be the preferred embodiment of my invention, it will be obvious to those skilled in the art that various changes and modifications may be made therein without departing from the invention, and it is therefore aimed in the appended claims to cover all such changes and modifications as fall within the true spirit and scope of the invention.

What I claim is new and desire to secure by Letters Patent of the United States is:

1. A valve for controlling fluid flow comprising a molded plastic valve body including a valve seat, an integrally formed inlet leading to said valve seat and an integrally formed outlet leading from said valve seat, valve means supported by said valve body and cooperating with said valve seat to control the flow between said inlet and said outlet, and a mounting and inlet unit for said valve body comprising a metal fitting positioned over said inlet and leading thereto, and a metal bracket secured to said valve body for mounting said body, said bracket holding said fitting in place on said valve body and said bracket and said fitting being integrated so that any torque applied to said fitting upon connection of a pipe is taken up by said bracket rather than by said plastic valve body, thereby to avoid damage to said valve body from cross-threading or stressing when a plumbing connection is made.

2. A valve for controlling fluid flow comprising a molded plastic valve body including a valve seat, an inlet leading to said valve seat and an outlet leading from said valve seat, valve means cooperating with said valve seat to control the flow between said inlet and said outlet, and an inlet and mounting unit for said valve body comprising rigid inlet fitting means leading to said inlet and rigid bracket means securing said fitting means and said valve body together, with said fitting means and said bracket means being integrated so that any torque applied to said fitting means is taken up by said bracket means.

3. A valve for controlling fluid flow comprising a molded plastic valve body including an inlet and an outlet, valve means cooperating with said valve body to control the flow between said inlet and said outlet, and an inlet and mounting unit for said valve body comprising rigid inlet fitting means engaging said valve body and leading to said inlet, and rigid bracket means holding said fitting means on said valve body and secured to said valve body for mounting said valve body, said fitting means and said bracket means being formed of rigid metal and being integrated so that any torque applied to said fitting means is taken up by said bracket means, thereby to avoid damage to said plastic valve body.

4. A valve for controlling fluid flow comprising a molded plastic valve body including a valve seat, an integrally formed inlet leading to said valve seat and an integrally formed outlet leading from said valve seat, a diaphragm mounted on said valve body and cooperating with said valve seat to control the flow between said inlet and said outlet, means including a solenoid mounted on said valve body for controlling the action of said diaphragm, and an inlet and mounting unit for said valve body comprising metallic inlet fitting means engaging said valve body and leading to said outlet, and rigid bracket means holding said fitting means on said valve body and secured to said valve body for mounting said body, said fitting means and said bracket means being formed of rigid metal and being integrated so that any torque applied to said fitting means is taken up by said bracket.

References Cited by the Examiner
UNITED STATES PATENTS

| | | | |
|---|---|---|---|
| 1,967,297 | 7/34 | Down | 285—61 XR |
| 1,994,226 | 3/35 | Martocello | 285—175 XR |
| 2,500,750 | 3/50 | Halenza | 251—120 |
| 2,712,324 | 7/55 | Lund | 251—30 XR |
| 2,922,616 | 1/60 | Budde | 251—148 |
| 2,944,565 | 7/60 | Dahl | 251—30 XR |
| 3,008,735 | 11/61 | Wijngaarden | 285—61 |

ISADOR WEIL, *Primary Examiner.*